United States Patent
Hallberg

(10) Patent No.: US 7,027,713 B1
(45) Date of Patent: Apr. 11, 2006

(54) METHOD FOR EFFICIENT MPEG-2 TRANSPORT STREAM FRAME RE-SEQUENCING

(75) Inventor: Bryan Severt Hallberg, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/452,020

(22) Filed: Nov. 30, 1999

(51) Int. Cl.
*H04N 5/91* (2006.01)

(52) U.S. Cl. .......................... 386/68; 386/111

(58) Field of Classification Search ............... 386/5–7, 386/33, 68, 81–83, 111, 112; 725/88
See application file for complete search history.

(56) References Cited

U.S. PATENT DOCUMENTS

| | | |
|---|---|---|
| 5,666,461 A | 9/1997 | Igarashi et al. |
| 5,668,810 A | 9/1997 | Cannella, Jr. |
| 5,668,916 A | 9/1997 | Fujinami |
| 5,687,275 A | 11/1997 | Lane et al. |
| 5,717,641 A | 2/1998 | Ando et al. |
| 5,717,816 A | 2/1998 | Boyce et al. |
| 5,727,113 A | 3/1998 | Shimoda |
| 5,729,648 A | 3/1998 | Boyce et al. |
| 5,729,649 A | 3/1998 | Lane et al. |
| 5,739,862 A | 4/1998 | Cen |
| 5,754,651 A | 5/1998 | Blatter et al. |
| 5,757,421 A | 5/1998 | Kato et al. |
| 5,768,466 A | 6/1998 | Kawamura et al. |
| 5,771,335 A | 6/1998 | Lee |
| 5,774,441 A | 6/1998 | Nakagawa |
| 5,793,927 A | 8/1998 | Lane |
| 5,802,240 A | 9/1998 | Asai |
| 5,832,172 A | 11/1998 | Jeon |
| 5,867,625 A | 2/1999 | McLaren |
| 6,065,050 A * | 5/2000 | DeMoney ..................... 725/88 |
| 6,445,738 B1 * | 9/2002 | Zdepski et al. ............... 386/68 |
| 6,480,664 B1 * | 11/2002 | Ting et al. ..................... 386/6 |

OTHER PUBLICATIONS

ISO/IEC 13818-1—Information technology—Generic coding of moving pictures and associated audio information: Systems Apr. 15, 1996.

* cited by examiner

*Primary Examiner*—James J. Groody
*Assistant Examiner*—Christopher Onuaku
(74) *Attorney, Agent, or Firm*—Chernoff, Vilhauer, McClung & Stenzel

(57) ABSTRACT

A method and apparatus for creating a trick play video display from an MPEG-2 digital video transport stream are described. A trick play transport stream frame sequence template for each transport stream frame sequence and trick play video display mode supported by a video recorder is stored in the recorder. When the recorder receives an input transport stream frame sequence, the sequence is identified and template corresponding to that sequence and the selected trick play display mode is selected. The template is used to identify frames of the input transport stream to be appended to the trick play display transport stream frame sequence. When the trick play transport stream frame sequence is constructed the program clock reference, presentation time stamps and decoding time stamps associated with the frames are updated from information in the template.

20 Claims, 5 Drawing Sheets

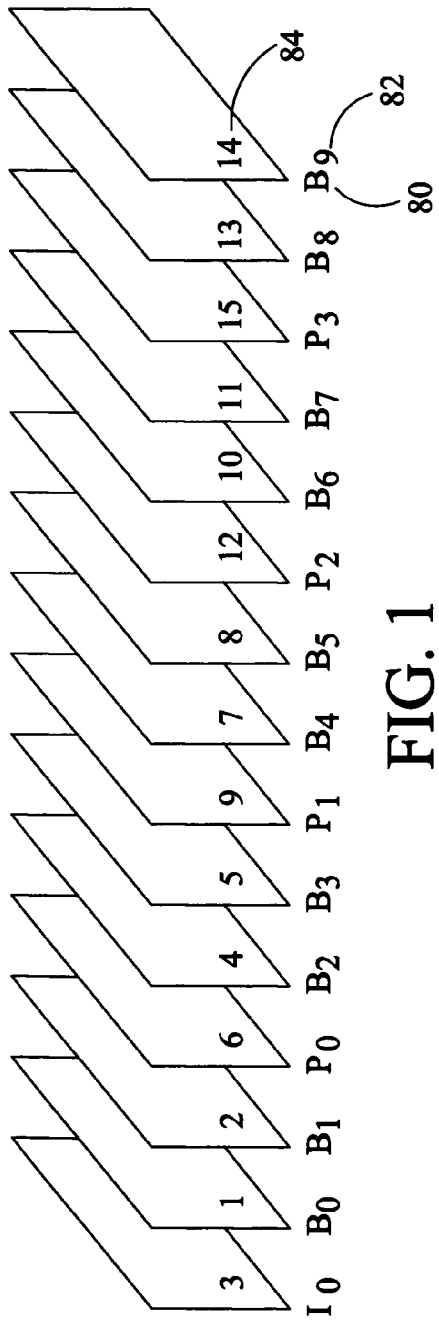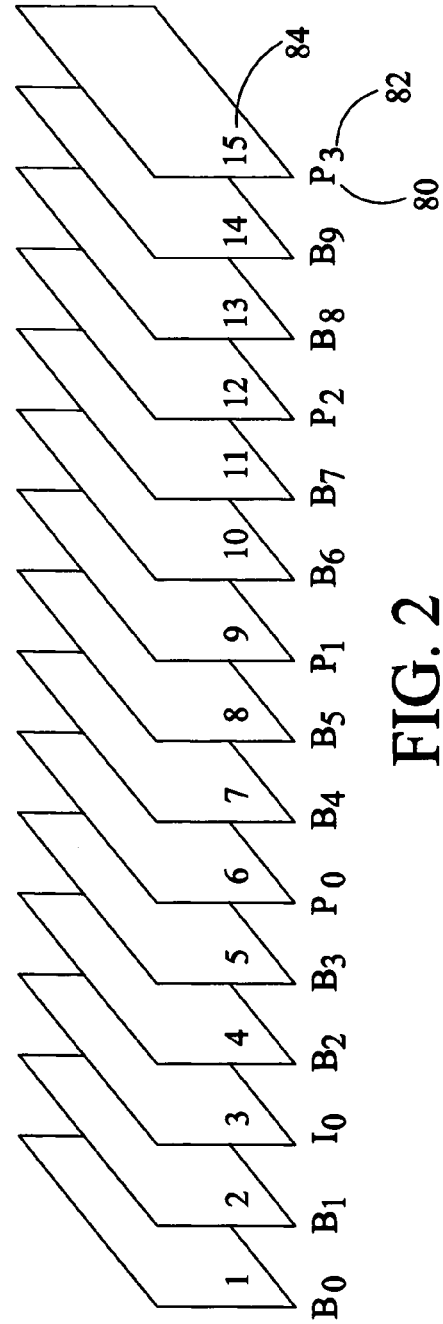

| TRANSPORT STREAM-FRAME INDEX 120 | FRAME 122 | TEMPORAL REFERENCE 124 | PCR 126 | DTS 128 | PTS 130 |
|---|---|---|---|---|---|
| 1 | I0 | 5 | 0 | 6000 | 63000 |
| 2 | P0 | 3 | 4500 | 9000 | 51000 |
| 3 | P1 | 2 | 7500 | 12000 | 42000 |
| 4 | P2 | 1 | 10500 | 15000 | 30000 |
| 5 | P3 | 0 | 13500 | 18000 | 21000 |
| 6 | I0 | 5 | 16500 | 30000 | 63000 |
| 7 | P0 | 3 | 21000 | 33000 | 51000 |
| 8 | P1 | 2 | 30000 | 36000 | 42000 |
| 9 | I0 | 5 | 33000 | 39000 | 63000 |
| 10 | P0 | 3 | 37500 | 42000 | 51000 |
| 11 | B2 | 4 | 40500 | 45000 | 57000 |

FIG. 7

METHOD FOR EFFICIENT MPEG-2 TRANSPORT STREAM FRAME RE-SEQUENCING

BACKGROUND OF THE INVENTION

The present invention relates to a video recorder and, more particularly, to a method of constructing trick play mode video displays from an MPEG-2 digital video transport stream using a digital video recorder.

A conventional analog video recorder records a video signal in its transmitted analog format (such as, the NTSC television signal format). At play time, the recorded signal is transmitted over a cable to a display device which is capable of displaying signals of that format. In addition to the standard play mode (forward direction, standard speed), analog video recorders are capable of displaying video in several "trick play" modes. Trick play modes include fast forward play, slow forward play, fast reverse play, slow reverse play, and pause. Consumers are likely to expect that video recorders used in conjunction with digital video will have, at least, the same trick play mode capabilities as analog video recorders. However, the MPEG-2 data compression techniques used with digital motion video make creation of trick play modes from the MPEG transport data stream problematic. The limited data rates and capacities of the decoder and a simple communication channel between a video recorder and a display device further complicate the creation of trick play video displays.

Motion video comprises a sequence of fields or frames (collectively referred to herein as frames) containing images or pictures. The images are originally recorded as analog signals and the analog signals are converted to digital data. The quantity of data resulting from converting analog signals to digital data is so great that digital motion video would be impractical if the data could not be compressed. However, there is considerable spatial redundancy within the data for an image and temporal redundancy between the images of a video sequence. MPEG-2 provides a toolkit of techniques that can be used to eliminate redundancy and, thereby, reduce the quantity of data required to digitally describe the images of the video sequence.

Typically, the succession of frames comprising a video sequence is divided for convenience into groups of frames or groups of pictures (collectively, GOP). The MPEG-2 standard provides for three types of video frames (I-, P-, and B-frames) based on the compression process used to encode the frame's data. Each GOP is anchored by an entirely self-coded (intracoded) frame or I-frame. Intracoding data compression techniques are used to reduce data redundancy within a single image, but the data necessary to decode and reconstruct an I-frame are available after compression. Since I-frames require a relatively large quantity of data, the number of I-frames is minimized. However, I-frames are periodically required in the data stream to enable recovery of the video stream after channel switching or error outages and the MPEG-2 standard requires an I-frame at least every 132 frames. P-frames and B-frames are produced with interframe data compression as well intraframe data compression. Interframe data compression uses motion estimation to predict the picture in a frame from the picture in one or more other reference frames (either an I- or P-frames). P-frames are frames that are forward predicted from a previous reference frame. Data for a P-frame includes motion estimation vectors describing movement of blocks of pixels between the current frame and the frame upon which prediction is based and the differential data which must be added to the blocks of the earlier frame to construct the image of the later P-frame. A P-frame requires roughly half the data of an I-frame. On the other hand, a B-frame is bidirectionally predicted from earlier and later reference frames. B-frame data comprises motion estimation vectors describing where data should be taken from the earlier and later frames and typically requires about one-fourth the data of an I-frame. B-frames are used to increase the compression efficiency and perceived picture quality but cannot be used to predict future frames. A GOP begins with an I-frame and comprises the frames from the intracoded (I-frame) anchor frame to the frame preceding the next I-frame in the data stream. A 12-frame GOP is typical for a system with a 25 frames per second display rate and a 15-frame GOP is typical for a 30 frames per second system. An exemplary 15-frame transport stream GOP might comprise the frames transmitted in the order illustrated in FIG. 1.

At the decoder, the transport stream is decoded, decompressed, and the frames are reordered to reconstruct the images of the original video image sequence in their correct temporal order. Since the data from earlier frames must be available to predict and reconstruct later frames, the frame transmission order will be different from the order in which the frames will be displayed. This requires that the encoder and decoder reorder the frames, even for standard speed, forward play mode. In standard speed, forward play mode the frames of the exemplary GOP illustrated in FIG. 1 would be displayed in the order illustrated in FIG. 2. The I-frame ($I_0$) is the third frame displayed but must be transmitted first so that $P_0$, $B_0$, and $B_1$ can be decoded. Likewise, $P_0$ is transmitted before $B_2$ and $B_3$ because $P_0$ and $I_0$ are necessary to decode the B-frames ($B_2$ and $B_3$). The exemplary GOP is an "open" GOP having a prediction link to a prior GOP. The initial B-frames ($B_0$ and $B_1$) are decoded from the data of frame $I_0$ and the last P-frame ($P_3$) of the previous GOP. MPEG also provides for a "closed" GOP with no prediction links to frames outside of the GOP.

As a result of the bidirectionally predicted, temporally forward nature of MPEG-2 compressed digital motion video, selecting transport stream frames or reversing the order of frames in the transport stream is of limited usefulness in producing trick play video displays. The creation of a trick play video display requires additional sequencing of the transport stream frames. For example, the frames of the exemplary transport stream GOP of FIG. 1 might be displayed as illustrated in FIG. 3 for a reverse direction, standard speed trick play display. Repetition of a frame in the illustration indicates that the frame is displayed for a number of frame periods equal to the number of times the illustration is repeated. For example, frame $P_3$ is repeated for three frame periods. Frames are repeatedly displayed in the trick play video display because the decoder is designed with capacity limitations dictated by the normal speed, forward direction decoding of the transport stream. The order in which frames might be decoded to produce the display illustrated in FIG. 3 is illustrated in FIG. 4. The forward prediction of MPEG-2 video may require that a number of frames be decoded to decode a displayed frame, although the decoded frames are not necessarily displayed. For example, frames $I_0$, $P_0$, $P_1$, and $P_2$ must be decoded so that frame $P_3$ can be decoded for display. Data storage limitations in the decoder and the quantity of data that must be decoded to display a frame out of the normal forward sequence may necessitate repeated decoding of frames. For example, approximately 70% more data must be decoded to display frame $P_3$ of the trick play display of FIG. 4 than is required to display frame $B_0$, the first frame of the standard speed, forward play GOP. Since the decoder is not designed to store this data or decode frames any faster than one frame per frame period, repeated display of a frame may be required to avoid overflowing the system and losing data.

While transport data streams are commonly divided into GOP, the MPEG-2 standard does not require the use of GOP. Further, the MPEG-2 standard does not specify the structure (frame types and numbers) of a GOP, if used. Since the sequence of frames required to create a trick play display depends upon the structure (frame types and sequence) of the input transport data stream, the trick play mode selected, and the design limitations of a decoder designed for standard speed, forward play; creation of a trick play display for an MPEG-2 compressed digital video program is difficult and can be computationally and resource intensive.

One method used to provide trick play video displays with recorders of MPEG-2 digital video is to first decode and store an entire GOP in the forward direction. The trick play system can then select a number of frames and a display order appropriate to create the trick play video display from the decompressed and decoded frames. However, the decoder must have large and costly frame buffers to store the decompressed versions of all the frames in the GOP. Since this is not required for normal forward play, the cost of the decoder or recorder would be substantially increased. In addition, the transmission channel between the recorder and the display could easily be overwhelmed by the quantity of data required to present a trick play display from decompressed data, especially in a fast play mode. Further, this technique requires that the entire GOP be decoded, even during fast play modes. To do this, the decoder must be capable of decoding multiple frames in a single normal frame decoding period. Most decoders do not have this capability.

A second method of providing trick play video displays is to decode and display only the I-frames of each GOP. An I-frame includes all of the data necessary to decode the frame and, therefore, the I-frames of a video sequence can be decoded and displayed in any order. Since I-frames are typically only one frame in 12 to 15 frames, each I-frame would be displayed for as many frame periods as are required to create the desired frame rate. However, video produced by displaying only the I-frames has a jerky quality because of the large gaps in the content produced by discarding the intervening P- and B-frames.

In a third method of creating a trick play video display sequence, frames are decoded but are not displayed until a frame that has been selected for the trick play video display is reached. The desired frame is then decoded and displayed. Since the method does not produce an MPEG-2 transport stream for transmission between the recorder and receiver, the recorder and the video decoder must reside in the same device so that bit rate control and timing are not issues.

In a fourth method of producing a trick play display, additional I-frames are generated during the recording process and stored on a separate track of the storage medium. The additional I-frames are used to assist in reverse play. However, generating additional I-frames may require an additional MPEG-2 encoder to be included in the video recorder substantially increasing its cost.

What is desired, therefore, is a method of constructing a trick play video display frame sequence that can be decoded in a standard MPEG-2 decoder from an MPEG-2 compliant transport stream. Further, it is desired that the trick play display video sequence produce a smooth display, minimize memory and processing requirements, and be capable of transmission over a bit rate limited transmission channel between the recorder and a display device.

SUMMARY OF THE INVENTION

The present invention overcomes the aforementioned drawbacks of the prior art by providing a method of creating a trick play video display from an input digital video transport stream frame sequence comprising the steps of selecting a trick play video display mode; identifying the input sequence of the transport stream frames; as a function of the input sequence and the trick play display mode, constructing a predetermined trick play display transport frame sequence including at least one transport stream frame from the input sequence. For applications supporting a limited number of transport stream frame sequences and a limited number of trick play display modes, predetermining MPEG-2 compliant trick play display transport stream frame sequences permits trick play displays to be created directly from the input transport stream without the necessity of large frame buffers, special decoders, high capacity communications channels, or intensive computation.

A trick play apparatus for a digital video recorder is also provided comprising a storage device for storing an input digital video transport stream frame sequence; a sequence identifier to compare the input transport stream frame sequence to at least one recognized transport stream frame sequence; a template memory to store at least one predetermined trick play display transport frame sequence template; a trick play display mode selector; a template selector to identify a trick play display transport frame sequence template in the template memory associated with the recognized transport stream frame sequence corresponding to the input transport stream frame sequence and a selected trick play mode; a trick play frame sequence memory; a frame sequencer to serially store at least one transport frame of the input transport frame sequence identified in the trick play display transport frame sequence template in the trick play frame sequence memory; and a time stamp calculator to calculate and associate at least one revised time stamp with each transport frame of the trick play display transport frame sequence.

The foregoing and other objectives, features and advantages of the invention will be more readily understood upon consideration of the following detailed description of the invention, taken in conjunction with the accompanying drawings.

BRIEF DESCRIPTION OF THE DRAWINGS

FIG. 1 is an illustration of an exemplary structure of an MPEG-2 transport stream group of frames.

FIG. 2 is an illustration of a display temporal ordering of the frames of the group of frames illustrated in FIG. 1.

FIG. 7 is an illustration of the data contents of a trick play display transport stream template.

DETAILED DESCRIPTION OF THE PREFERRED EMBODIMENT

Figure 5:
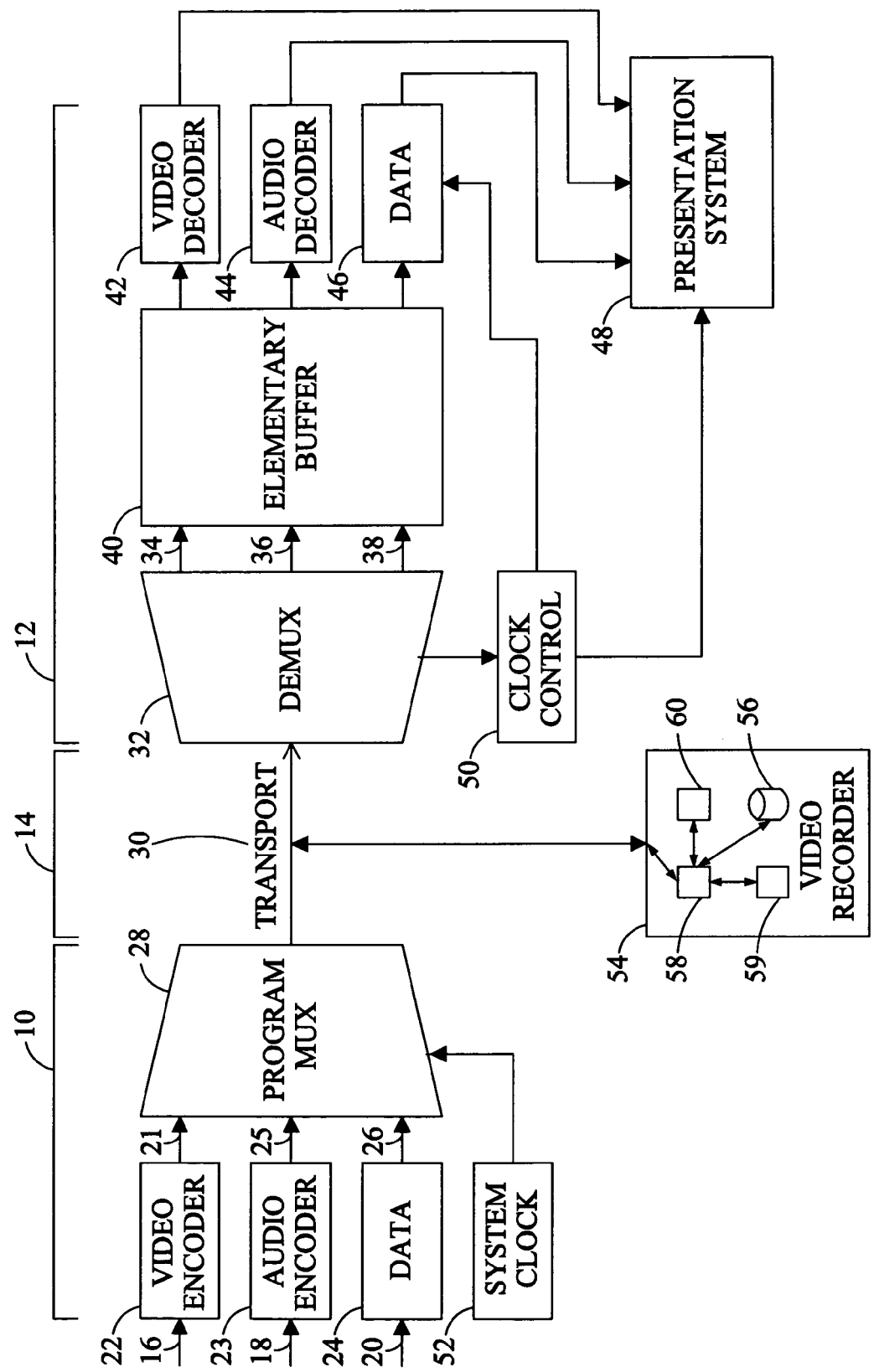
FIG. 5 is a block diagram of a digital motion video system and a video recorder.

Referring to FIG. 5, an MPEG-2 digital video system comprises an encoder 10 (indicated by a bracket) and a decoder 12 (indicated by a bracket) connected by a communication channel 14 (indicated by a bracket). In the encoder 12, the source data for the video 16, audio 18, and data 20 elements of a video production are converted to digital format and compressed, as appropriate, in separate video 22, audio 23, and data 24 application encoders. The compressed video 21, audio 25, and data 26 elementary data streams are input to a program multiplexing subsystem 28 where the elementary streams are packetized to form packetized elementary streams. The several packetized elementary streams are further packetized and multiplexed into a single transport stream 30 which is delivered to the decoder 12 over the communication channel 14. At the decoder 12, a demultiplexer 32 separates the transport stream 30 into the separate video 34, audio 36, and data 38 elementary streams. The elementary data streams are temporarily stored in an elementary buffer 40. At the appropriate decoding time, the elementary data streams are removed from the elementary buffer 40 and decoded and decompressed in the individual video 42, audio 44, and data 46 application decoders. The decoded data is input to a presentation system 48 for presentation to a viewer at a time specified for each unit of data in the transport stream 30.

The correct decoding and presentation times for synchronized presentation of instants of the video program elements are specified by time stamps in the data packets. A clock control 50 at the decoder 12 is synchronized to a system clock 52 at the encoder 10. Samples of the system time produced by the system clock 52, known as program clock references (PCR), are transmitted in packets in the transport data stream 30. The PCRs are used to adjust the time at the decoder clock control 50 to maintain synchronization to the system time for each video program. When the data is packetized in the program multiplexer 28, time stamps are included in the data packets containing units of data for each elementary stream 21,25,26. A time stamp is a system time value at which some action affecting the associated data unit is to occur. Each packet includes a presentation time stamp (PTS) specifying the system time at which the unit of data is to be presented by the presentation system 48. A data packet may also include a decoding time stamp (DTS) specifying the system time moment at which decoding should commence. A DTS is optional as the decoding time for a data unit can be inferred by the system.

The digital video system may include a video recorder 54 to record data from the transport stream 30 for later retransmission. The video recorder may record the transport stream 30 data on a disk or tape storage device 56. The video recorder 54 of the present invention also includes a controller 58 and an associated data memory 60.

Without data compression, the quantity of data resulting from converting analog source signals to digital data would be too great for a practical digital video system. The MPEG-2 standard, ISO/IEC 13818-1, INFORMATION TECHNOLOGY—GENERIC CODING OF MOVING PICTURES AND ASSOCIATED AUDIO INFORMATION, International Standards Organization, 1995 (incorporated by reference herein) provides a toolkit of data compression techniques for use in digital motion video applications. The data compression techniques include intraframe and interframe data compression techniques.

Digital video comprises a sequence of frames or fields (collectively referred to herein as frames) containing images or pictures. Typically, the succession of frames comprising a video sequence is divided into groups of frames or groups of pictures (GOP). A 12-frame GOP is typical for a system with a 25 frames per second display rate and a 15-frame GOP is typical for a system with a 30 frames per second display rate. An exemplary 15-frame, transport stream GOP might comprise the frames and be transmitted in the order illustrated in FIG. 1. Each frame of the GOP is identified by its frame type 80 and a subscript frame order index 82. Further, the temporal order 84 (the order in which the frame was created and is normally displayed) is associated with each frame when it is compressed.

The MPEG-2 standard provides for three types of frames (I-, P-, and B-frames) based on the techniques used to compress the frame's data. Each GOP is anchored by an entirely self-coded (intracoded) frame or I-frame. Intraframe coding or intracoding utilizes a number data compression techniques to reduce spatial redundancy in the data of a single image. While the quantity of data required to describe the image is reduced, all of the data necessary to decode and reconstruct the I-frame is transmitted. I-frames require a relatively large quantity of data so the number of I-frames is minimized. However, I-frames are periodically required to enable recovery of the video data stream after channel switching or error outages and the MPEG-2 standard requires an I-frame at least every 132 frames.

P-frames and B-frames are the result of intraframe coding and interframe coding which is directed at reducing the temporal data redundancy between frames. Interframe coding relies on motion prediction to determine the difference between the content and position of the image in a current frame and one or more reference frames. The current frame is reconstructed from the content of the applicable reference frames and the information related to the difference between the images in the current and reference frames. Blocks of pixels in a current frame are identified and a search is made of the reference frame to locate a similar block. A motion estimation vector describing the direction and distance of movement of the block is calculated. Only the differential data and the motion estimation vectors are encoded and transmitted. Data which has been previously transmitted are not retransmitted. P-frames are forward predicted from an earlier reference frame (either an I- or P- frame). P-frame data includes the motion estimation vectors and differential data necessary to reconstruct the P-frame from the data of the earlier reference frame. A P-frame requires roughly half the data of an I-frame. A B-frame is bidirectionally predicted from both a temporally earlier and a temporally later reference frame (either an I-frame or P-frame). B-frame data comprises vectors describing where data should be taken from the earlier and later frames and typically requires about one-fourth the data of an I-frame. B-frames are used to increase the compression efficiency and perceived picture quality but cannot be used to predict future frames. The MPEG standard designates the exemplary transport stream GOP of FIG. 1 as an open GOP because it has data links to another GOP. Frames $B_0$ and $B_1$ are bidirectionally predicted from frame $I_0$ and the last reference frame ($P_3$) of the previous GOP. The MPEG standard also provides for a closed GOP that has no prediction links to another GOP.

Figure 3:
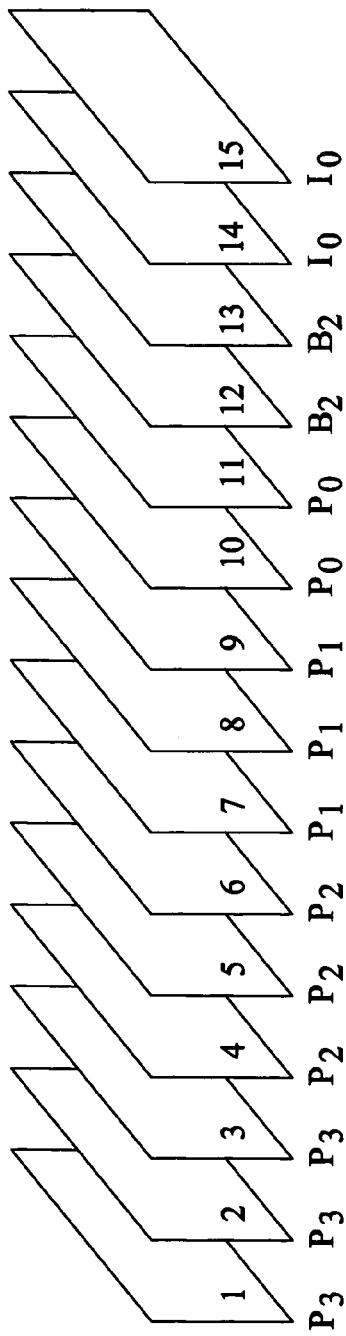
FIG. 3 is an illustration of frames to be displayed for a standard speed, reverse trick play video display of the group of frames illustrated in FIG. 1.
Figure 4:
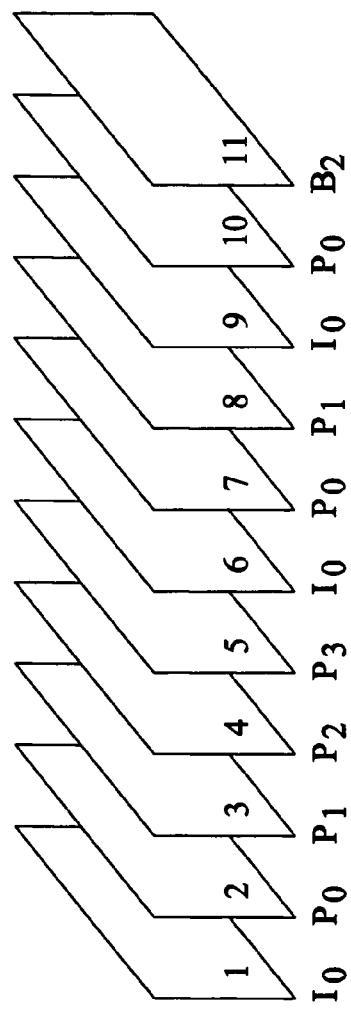
FIG. 4 is an illustration of an MPEG-2 transport stream group of frames to create the standard speed, reverse trick play video display illustrated in FIG. 3.

Since information from certain frames must be available in order to decode later frames, the order of transmission in the transport stream GOP is not the same as the temporal order in which the frames were originally recorded and in which they will be displayed. Even for forward play at standard speed, the decoder must reorder the frames of the transport stream GOP before they are displayed. In standard speed, forward play mode the exemplary transport stream GOP illustrated in FIG. 1 would be displayed in the order illustrated in FIG. 2. The creation of an MPEG-2 compliant transport stream for a trick play video display requires additional selection and reordering of the transport stream frames to create an appropriate sequence of displayed frames. For example, a reverse, standard speed trick play display of the exemplary GOP of FIG. 1 might require the display of the frames illustrated in FIG. 3. Some frames of the trick play display are displayed for multiple frame periods because of the structure of the MPEG-2 transport stream and limitations of the MPEG-2 decoder and the communication channel. First, a number of frames may require decoding in order to decode the displayed frame. This is particularly true for reverse trick play modes. For example, FIG. 4 illustrates a transport stream GOP structure to produce the reverse, standard speed trick play display of FIG. 3 from the transport stream GOP of FIG. 1. The frame sequence $I_0$, $P_0$, $P_1$, and $P_2$ must be decoded to decode the first displayed frame of the trick play video display ($P_3$). However, this frame sequence is not displayed. The decoder 12 is usually limited to decoding one frame per frame period. Further, the capacity of the elementary buffer 40 is designed around the bit rate requirements of the standard speed, forward play mode. However, the frame sequence $I_0$, $P_0$, $P_1$, $P_2$, $P_3$ includes approximately 70% more data than is required for the sequence $I_0$, $P_0$, $B_3$ that is required to decode the first displayed frame of the GOP in the standard speed, forward mode. Therefore, some frames of the trick play video display of FIG. 3 are displayed for repeated frame periods to avoid overflowing the decoder and communication channel while decoding transport frames in a sequence dictated by the MPEG-2 prediction order. As a result, there are a limited number of MPEG-2 compliant trick play GOPs that can be created for each possible trick play display mode and for each transport stream GOP structure.

Figure 6:
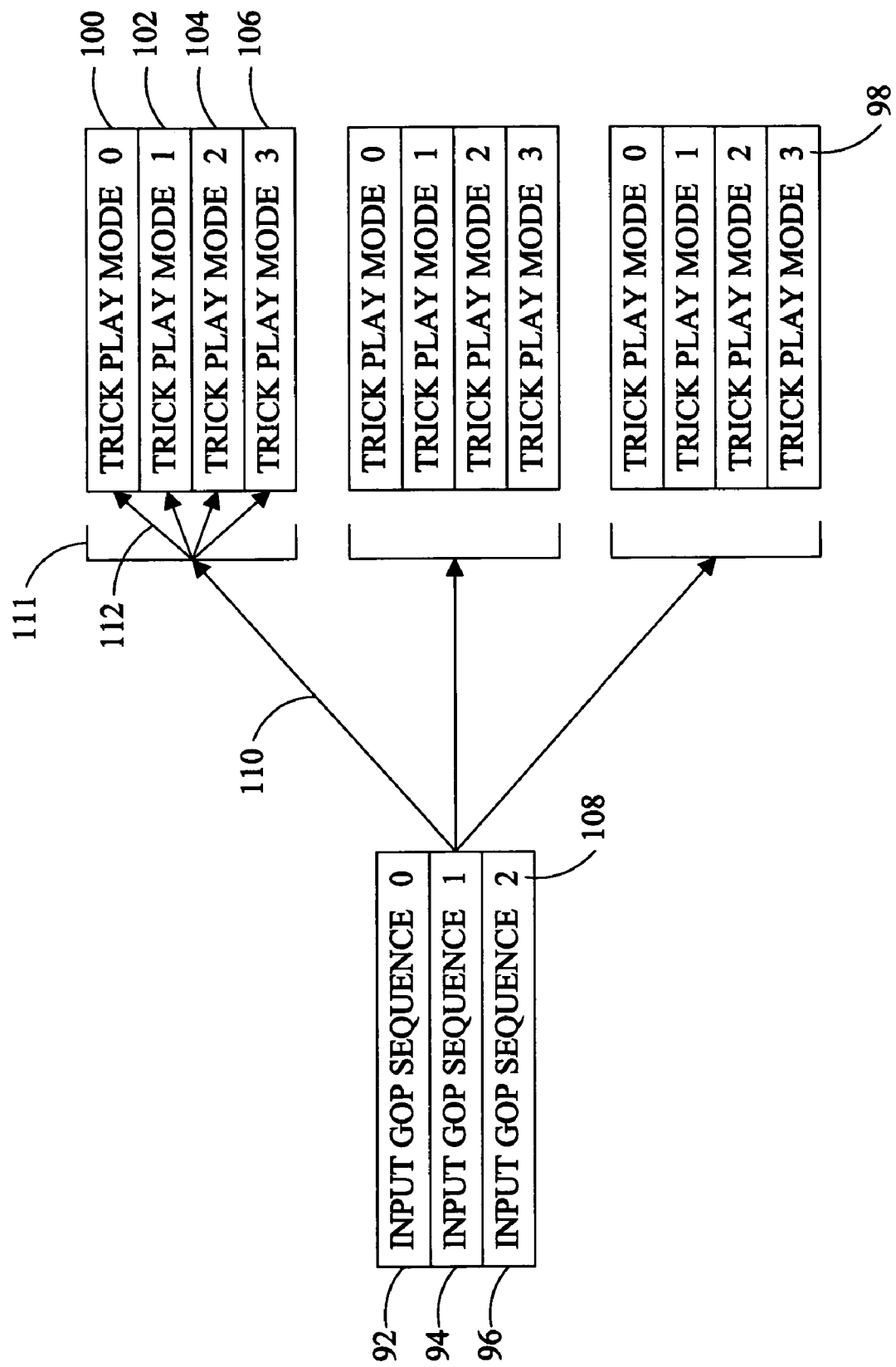
FIG. 6 is an illustration of an array of trick play display transport stream templates.

While the MPEG-2 standard does not standardize the transport stream GOP structure or even specify that a GOP is used in the transport stream, the present inventor realized that digital video recorders support a limited number of transport stream GOP structures and provide a limited number of trick play video display mode options. Referring to FIG. 6, in the present invention, a predetermined template of the frame sequence of an MPEG compliant, trick play transport stream GOP is developed for each input transport stream GOP structure recognized by the video recorder and for each trick play display mode of which the recorder is capable. In the example illustrated in FIG. 6, the recorder supports three input transport stream GOP sequences 92, 94, and 96 and produces four trick play video display modes (identified by index numbers 98). A trick play transport stream sequence template 100, 102, 104, 106 is created for each trick play display mode and each input transport stream GOP structure 92, 94, 96 recognized by the video recorder. Referring to FIG. 5, the templates are stored in the memory 60 of the recorder 54.

The structure of the input transport stream GOP is detected either at the time the trick play transport stream sequence is created or when the input transport stream 30 is stored in the storage device 56. When the viewer selects a trick play video display mode with a trick play display mode selector in the controller 58, a sequence identifier in the controller 58 compares the input frame sequence to an index of recognized transport stream sequences. The trick play display frame sequence template 100, 102, 104, 106 appropriate for the detected input transport stream frame sequence 92, 94, or 96 is recalled from memory 60. The templates are arranged in a template array that is indexed by an input transport stream GOP index number 108. The index number 108 is obtained when the input transport stream sequence is compared to the list of indexed recognized GOP structures. The input template array contains a pointer 110 to an array of templates 111 appropriate for an input transport stream frame sequence and a pointer 112 to trick play frame sequence templates for each trick play display mode. A trick play display frame sequence template is appropriate to an input transport frame sequence if the bit content of each type of frame is less than that specified in the template. The bit counts of the frames of the input transport stream are tested to determine if the input GOP structure (frame sequence and bit count) satisfies the requirements of the template.

Referring to FIG. 7, each transport frame 120 of the trick play display frame sequence is mapped from a transport frame of the input transport stream GOP 122. The trick play frame sequence template includes the transport frame temporal reference 124 and a map listing a program clock reference (PCR) 126, a presentation time stamp (PTS) 130 and a decoding time stamp (DTS) 128 for each frame of the trick play transport stream GOP frames. The PCR 126, PTS 130, and DTS 128 values are relative to a current program clock reference (PCR) at the initiation of the trick play video display. When the trick play display template has been retrieved, transport frames from the input transport data stream are appended to the trick play display frame sequence stored in a trick play frame sequence buffer 59 in the order specified in the template by frame sequencer in the controller 58. At the trick play display run time, the PCR, PTS, DTS and temporal reference of the frames of the trick play display sequence are updated. The new values of the PCR, PTS and DTS are calculated in the controller 58 from on the sum of the current PCR at initiation of the trick play video display and the relative system time increments 126, 128, 130 specified a trick play display template. Very little computation is necessary to update the timing values from the incremental values in the template.

If direct streaming of data from the hard disk is required, each input transport stream frame can be streamed up to the required field and then the system can process the updated field. Alternatively, a field updater to store the bit locations of the update data fields and their updated values can be included in the controller 58 between the disk storage 56 and the output. The timing values can be updated as each field passes through the controller 58. Data fields which are not updated are ignored by the controller 58.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of creating a trick play video display from an input standard display mode digital video transport stream frame sequence comprising the steps of:
   (a) receiving a trick play video display mode selection;
   (b) identifying said input standard display mode digital video transport stream frame sequence from a predefined set of standard display mode transport stream frame patterns, each predefined standard display mode transport stream frame pattern having a corresponding set of predetermined trick play transport stream sequence templates; and (c) after receipt of said trick play video display mode selection, constructing a trick play display transport frame sequence from said input standard display mode digital video transport stream frame sequence using one of said predetermined trick play transport stream sequence templates corresponding to said trick play video display mode selection and further corresponding to the predefined standard display mode transport stream frame pattern identified in step (b), said trick play display transport frame sequence including at least one transport stream frame from said input standard display mode digital video transport stream frame sequence, wherein said trick play display transport frame sequence is free from being created based upon a frame sequence different than said input standard display mode digital video transport stream frame sequence, and said trick play display transport frame sequence to be constructed after said trick play video display mode selection is free from existing as a separate video file from said input standard display mode digital video transport stream frame sequence.

2. The method of claim 1 further comprising a step of associating with at least one transport stream frame of said trick play display transport frame sequence at least one timing datum related to presentation of said trick play video display.

3. The method of claim 2 wherein said at least one timing datum comprises a function of a system time increment and a system time moment current at initiation of said trick play video display.

4. The method of claim 1 wherein the step of identifying said input sequence of transport stream frames comprises the step of comparing said input sequence to an index of at least one recognized sequence of transport stream frames.

5. The method of claim 4 wherein said input sequence of transport stream frames is compared to said index when said sequence of transport stream frames is input.

6. The method of claim 4 wherein said input sequence of transport stream frames is compared to said index when said trick play video display is initiated.

7. The method of claim 1 wherein the step of constructing said trick play display transport frame sequence comprises the steps of:
(a) as a function of said input transport stream frame sequence and said trick play display mode selection, identifying said predetermined template for said trick play display transport frame sequence;
(b) locating in said input transport stream frame sequence at least one transport stream frame designated in said predetermined template;
(c) appending said located transport stream frame to said trick play display transport frame sequence; and
(d) revising at least one timing datum associated with at least one transport stream frame included in said trick play display transport frame sequence.

8. The method of claim 7 wherein the step of revising at least one timing datum comprises the steps of:
(a) determining an initial system time at initiation of said trick play display;
(b) replacing at least one timing datum with a function of said initial system time and a system time increment specified by said template.

9. A method of creating a trick play video display from an input standard display mode digital video transport stream frame sequence comprising the steps of:
(a) receiving a trick play video display mode selection;
(b) identifying a recognized transport stream frame sequence corresponding to said input standard display mode transport stream frame sequence from a predefined set of transport stream frame patterns, each of said predefined transport stream frame patterns having a corresponding set of predetermined trick play transport stream sequence templates;
(c) as a function of said identified recognized transport stream frame sequence and said trick play display mode selection, choosing one of said predetermined templates corresponding to said trick play display mode selection and further corresponding to the predefined standard display mode transport stream frame pattern identified in step (b);
(d) after receipt of said trick play video display mode selection, appending to a trick play display transport stream frame sequence at least one said input transport stream frame identified in said chosen predetermined template; and
(e) updating a timing datum associated with at least one appended transport stream frame with a function of a time increment specified in said chosen predetermined trick play display transport stream sequence template and a current system time at initiation of said trick play video display, wherein said trick play display transport stream frame sequence is free from being created based upon a frame sequence different than said input standard display mode digital video transport stream frame sequence, and said trick play display transport stream frame sequence to be constructed after said trick play video display mode selection is free from existing as a separate video file from said input standard display mode digital video transport stream frame sequence.

10. The method of claim 9 wherein the step of identifying a recognized transport stream frame sequence corresponding to said input transport stream frame sequence comprises the steps of:
(a) comparing said input transport stream frame sequence to at least one recognized sequence of transport stream frames; and
(b) comparing a quantity of data for at least one transport stream frame of said input transport stream frame sequence with a quantity of data for at least one frame of at least one recognized sequence of transport stream frames.

11. A method of processing an input normal forward play digital video frame stream comprising the steps of:
(a) receiving a trick play display mode selection different than normal forward play;
(b) identifying a sequence of frames from a predefined set of frame patterns comprising said input normal forward play digital video frame stream, each predefined frame pattern having a corresponding set of predetermined transport stream sequence templates;
(c) after receipt of said trick play display mode selection, and as a function of said sequence of frames and said display mode selection, constructing a predetermined stream frame sequence using one of said predetermined transport stream sequence templates corresponding to said display mode selection and further corresponding to the predefined frame pattern identified in step (b), including at least one frame from said input digital video frame stream, wherein said predetermined stream frame sequence is free from being created based upon a frame sequence different than said input normal forward play digital video frame stream, and said predetermined stream frame sequence to be constructed after said trick play display mode selection is free from existing as a separate video file from said input normal forward play digital video frame stream.

12. The method of claim 11 further comprising a step of associating with frame of said predetermined stream frame sequence at least one timing datum related to presentation of said predetermined stream frame sequence.

13. The method of claim 12 wherein said timing datum comprises a function of a system time increment and a system time moment current at initiation of a display of said predetermined stream frame sequence.

14. The method of claim 11 wherein the step of identifying said sequence of frames comprising said input digital video frame stream comprises the step of comparing said sequence of frames to an index of at least one recognized stream frame sequence.

15. The method of claim 14 wherein said sequence of frames is compared to said index when said sequence is input to said method.

16. The method of claim 14 wherein said sequence of frames is compared to said index when display of said predetermined stream frame sequence is initiated.

17. The method of claim 11 wherein the step of constructing said predetermined stream frame sequence comprises the steps of:
 (a) as a function of said input digital video frame stream and said display mode selection, identifying said predetermined transport stream sequence template for said predetermined stream frame sequence;
 (b) locating in said sequence of frames comprising said input digital video frame stream at least one said stream frame designated in said predetermined template;
 (c) appending said located stream frame to said predetermined stream frame sequence; and
 (d) revising at least one timing datum associated with said stream frame appended to said predetermined stream frame sequence.

18. The method of claim 17 wherein the step of revising said timing datum comprises the steps of:
 (a) determining an initial system time at initiation of said display of said predetermined stream frame sequence;
 (b) replacing said timing datum with a function of an initial system time and a system time increment specified by said template.

19. A method of processing an input normal forward play digital video stream frame sequence comprising the steps of:
 (a) receiving a display mode selection different from normal forward play;
 (b) identifying at least one of a plurality of predetermined stream frame sequences corresponding to said input normal forward play digital video stream frame sequence from a predefined set of stream frame sequences, each predefined stream frame sequence having a corresponding set of predetermined templates;
 (c) as a function of said identified sequence and said display mode selection, choosing one of said predetermined templates corresponding to said display mode selection and further corresponding to the predefined stream frame sequence identified in step (b);
 (d) after receipt of said display mode selection, appending to a trick play frame sequence at least one frame of said input normal forward play digital video stream frame sequence identified in said template; and
 (e) updating a timing datum associated with said appended frame with a function of a time increment specified in said template and a current system time at initiation of displaying at least a portion of said trick play frame sequence, wherein said trick play frame sequence is free from being created based upon a frame sequence different than said input normal forward play digital video stream frame sequence, and said trick play frame sequence to be constructed after said display mode selection is free from existing as a separate video file from said input normal forward play digital video stream frame sequence.

20. The method of claim 19 wherein said step of identifying said predetermined stream frame sequence corresponding to said input stream frame sequence comprises the steps of:
 (a) comparing said input stream frame sequence to at least one predetermined frame sequence; and
 (b) comparing a quantity of data for at least one frame of said input stream frame sequence with a quantity of data specified for at least one frame of said predetermined template.

* * * * *